United States Patent [19]

Madden et al.

[11] Patent Number: 4,499,768
[45] Date of Patent: Feb. 19, 1985

[54] CANTILEVER SUPPORT FOR AN APPARATUS TO DETERMINE THE IMBALANCE IN A ROTATING OBJECT

[75] Inventors: Allan C. Madden, Woodside; Robert Cellucci, San Jose; Robert A. Hoshida; Duncan MacKay, both of Mountain View, all of Calif.

[73] Assignee: Coats Wheel Balancer Corp., Santa Clara, Calif.

[21] Appl. No.: 415,898

[22] Filed: Sep. 8, 1982

[51] Int. Cl.³ ............................................. G01M 1/22
[52] U.S. Cl. ........................................ 73/462; 73/475
[58] Field of Search ................................ 73/462–465, 73/466, 475, 66, 487

[56] References Cited

U.S. PATENT DOCUMENTS 3,646,824  3/1972  Dilland ............................... 73/457
4,254,658  3/1981  Kogler et al. ...................... 73/462
4,423,632  1/1984  Madden et al. ..................... 73/462

FOREIGN PATENT DOCUMENTS 2700098  10/1977  Fed. Rep. of Germany ........ 73/462

*Primary Examiner*—James J. Gill
*Attorney, Agent, or Firm*—Limbach, Limbach & Sutton

[57] ABSTRACT

An apparatus for determining the imbalance in a rotating object has a drive means for rotating the object about an axis. Transducers measure the force of imbalance of the rotating object, with each transducer producing an electrical signal in response thereto. Electronic means receives the signals from the transducers and calculates the imbalance in the object. Drive means is directly coupled to the rotating object, such as a tire, with the drive means in the hub of the wheel on which the tire is mounted. Cantilever support means having a substantially planar surface provides support for the drive means onto the transducers in the frame of the apparatus.

5 Claims, 2 Drawing Figures

CANTILEVER SUPPORT FOR AN APPARATUS TO DETERMINE THE IMBALANCE IN A ROTATING OBJECT

TECHNICAL FIELD

The present invention relates to an apparatus for determining the imbalance in a rotating object and a cantilever support therefor.

BACKGROUND ART

Apparatus to determine the mass of imbalance in a rotating tire is well known. See, for example, Great Britain Pat. No. 939,693 and Great Britain Pat. No. 1,247,596. See, additionally, U.S. Pat. Nos. 2,378,018; 2,828,911; 3,102,429; 3,724,279; 3,812,725; 3,835,712; 3,910,121; 3,911,751; 3,922,922; 3,991,620; and 4,173,146. See also U.S. Patent Application Ser. No. 238,091, filed on Feb. 25, 1981 in the name of Allan C. Madden and Albert L. Mitchell. All of the foregoing patents and patent application teach an apparatus to measure the force of imbalance of a rotating object, such as a tire. In general, all of the references teach an apparatus having a frame containing sensor means for determining the velocity of the tire, force transducer means for determining the magnitude of the force of imbalance, and calculating means for determining the position and magnitude of the imbalance in the tire.

The drive means for rotating the tire can be directly or indirectly coupled to the tire. Where the drive means is directly coupled to the tire, the drive means is directly mounted in the frame on a plate over the force transducers. A long shaft extends from the drive means to the tire.

SUMMARY OF THE INVENTION

The present invention is an improvement to an apparatus for determining the position and force of imbalance in a rotating tire which is mounted on the rim of a wheel having a central hub. The apparatus has a frame which contains sensor means for determining the velocity of the tire, force transducer means for determining the magnitude of the force of imbalance, and calculating means for determining the position and magnitude of the imbalance on the tire. The improvement comprises drive means directly coupled to the tire for rotating the tire. A cantilever support means supports the drive means on the frame. The cantilever support has a substantially planar surface for supporting the drive means on the force transducers in the frame.

DETAILED DESCRIPTION OF THE INVENTION

Figure 1:
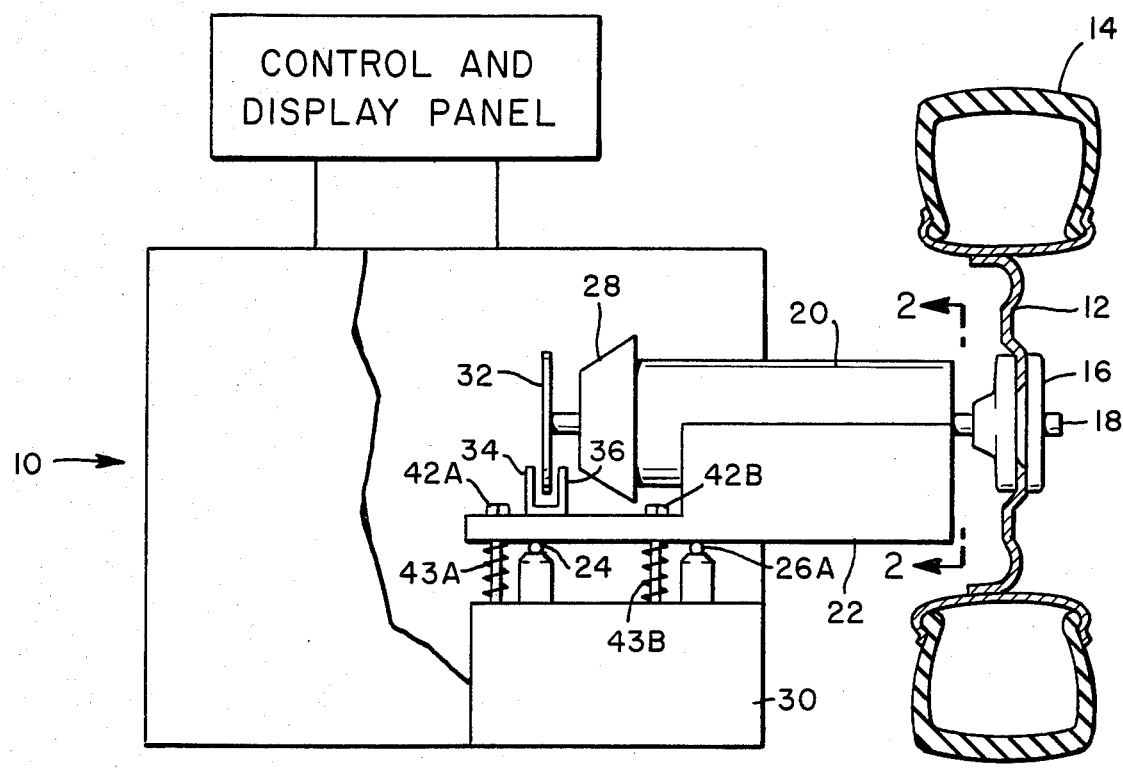
FIG. 1 is a partially cut-away side view of the apparatus of the present invention.
Figure 2:
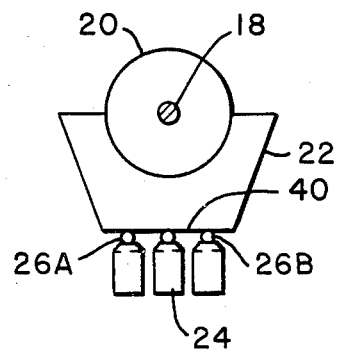
FIG. 2 is a sectional view of a portion of the apparatus shown in FIG. 1 taken along the line 2—2.

Referring to FIG. 1, there is shown an apparatus 10 of the present invention. The apparatus 10 can measure the forces of imbalance of a wheel 12 with a tire 14 mounted on the rim thereof. The wheel 12 has a central hub 16. The wheel 12 is mounted on a solid shaft 18. An induction squirrel-cage type motor 20 (for example eight-pole asynchronous motor) is directly coupled to the shaft 18 at one end. The motor 20 is supported on a cantilever support 22. The cantilever support 22 supports the motor 20 on the frame 30. The support 22 has a planar surface 40. The planar surface 40 of the cantilever support 22 rests on a first transducer 24, a second and third transducers 26 (A and B). The transducers 24 and 26 (A and B) can be of any well-known type of transducer that is capable of detecting forces exerted thereon. Typically, the transducers can be piezo-electric, capacitive, variable reluctance, resistive strain gauge, or other types. In the preferred embodiment, piezo-electric transducers are used.

The motor 20 is supported at the other end thereof by a motor end bell 28. The motor end bell 28 and the cantilever support 22 restrain the motor 20 from movement in either of the horizontal directions. A toothed wheel 32 is attached to the other end of motor 20. The toothed wheel 32 is a rotational angle transducer for determining the angular position of the motor 20. At a fixed location, an optical source 34, such as a light bulb, emits a beam of light directed to an optical sensor 36 passing through the toothed wheel 32. The toothed wheel 32 has a plurality of apertures equal distance from one another. As the wheel 32 rotates, the apertures interrupt the beam from the optical source 34 to the sensor 36, as well as permit the beam to be transmitted therethrough depending on the position of the toothed wheel 32. Such a system is well known in the art to determine the angular position of the rotating shaft which is connected to the rotating motor 20; see, for example U.S. Pat. No. 3,910,121.

In the apparatus 10 of the present invention, the motor 20 is mounted within the hub 16 of the wheel 12. As a consequence, the shaft 18 which connects the motor 20 to the wheel 12 is shorter than the shafts of the prior art. Because the shaft 18 is shorter, there is less stress upon the shaft 18 and wear and tear during the life of use of the apparatus. As a result, frequency of repair can be substantially decreased. Moreover, because the shaft 18 is shorter, it can be more economically produced. However, because the motor 20 is mounted within the hub 16 of the wheel 12, a portion of the motor 20 is mounted outside of the frame 30. Thus, a cantilever support 22 must support the motor 20 onto the frame 30.

The cantilever support 22 has a planar surface 40 which rests on the force transducers 24 and 26 (A and B). The motor 20 rests on the support 22. The surface 40 must be substantially planar in order that the force of the motor 20 is evenly distributed over the transducers. The support 22 is mounted on the frame 30 by a plurality of bolts 42 (A and B). Each bolt passes through a spring 43 between the support 22 and the frame 30. The springs 43 provided suspension support for the support 22.

It has been discovered that, if the support 22 were made by the extrusion process, the planar surface 40 is readily made as a part of the extrusion process. For example, the support 22 can be made of aluminium through the extrusion process. The surface 40 is rendered planar without milling or any additional processing. The motor 20 is supported at the other end by a motor end bell 28 which can be of cast and turned end bell. It, too, can be made without any milling. Finally, the motor 20 can be an inexpensive electrical motor, such as an eight-pole asynchronous motor, or the motor 20 can also be an air motor. Since most tire shops and garages in which the apparatus 10 of the present invention will be used have a compressed air supply, an air motor can readily be used.

We claim:

1. In an apparatus for determining the position and force of imbalance in a rotating tire mounted on the rim of a wheel with a central hub, said apparatus having a frame containing sensor means for determining the velocity of said tire, force transducer means for determining the magnitude of the force of imbalance, and calculating means for determining the position and magnitude of said imbalance on said tire, wherein the improvement comprising:

motor means having a shaft means directly coupled to said tire for rotating said tire, said motor means positioned with a portion thereof protruding from said frame in a direction towards the wheel; and cantilever support means, for supporting said portion of said motor means protruding from said frame, said support means having a substantially planar surface for supporting said motor means on said force transducer means in said frame.

2. The apparatus of claim 1, wherein said drive means is positioned in said hub.

3. The apparatus of claim 2, wherein said drive means is an electric motor.

4. The apparatus of claim 2, wherein said drive means is an air-driven motor.

5. The apparatus of claim 1, wherein said support means is manufactured by extrusion process.

* * * * *